(12) United States Patent
Kweon et al.

(10) Patent No.: US 12,437,670 B2
(45) Date of Patent: Oct. 7, 2025

(54) VIRTUAL REALITY-BASED GROUND GAIT TRAINING SYSTEM AND METHOD

(71) Applicant: NATIONAL REHABILITATION CENTER, Seoul (KR)

(72) Inventors: Hyosun Kweon, Gwacheon-si (KR); Hyun-Kyung Kim, Seoul (KR); Seul Gi Kim, Seoul (KR); Kuem Ju Lee, Seoul (KR); So Ra Park, Incheon (KR)

(73) Assignee: National Rehabilitation Center, Seoul (KR)

( * ) Notice: Subject to any disclaimer, the term of this patent is extended or adjusted under 35 U.S.C. 154(b) by 814 days.

(21) Appl. No.: 17/775,352

(22) PCT Filed: Nov. 6, 2020

(86) PCT No.: PCT/KR2020/015467
§ 371 (c)(1),
(2) Date: May 9, 2022

(87) PCT Pub. No.: WO2021/101138
PCT Pub. Date: May 27, 2021

(65) Prior Publication Data
US 2022/0392370 A1 Dec. 8, 2022

(30) Foreign Application Priority Data
Nov. 19, 2019 (KR) .................. 10-2019-0148257

(51) Int. Cl.
*G09B 19/00* (2006.01)
*A63B 71/06* (2006.01)

(52) U.S. Cl.
CPC ........ *G09B 19/003* (2013.01); *A63B 71/0622* (2013.01); *A63B 2071/0641* (2013.01); *A63B 2214/00* (2020.08); *A63B 2230/625* (2013.01)

(58) Field of Classification Search
CPC .................. A61H 3/00; A61B 5/112
(Continued)

(56) References Cited

U.S. PATENT DOCUMENTS

2012/0059432 A1* 3/2012 Emborg ............. A61N 1/36034
607/49
2014/0228985 A1* 8/2014 Elliott ................... A61B 5/11
700/91
(Continued)

FOREIGN PATENT DOCUMENTS

JP 2018050989 A * 4/2018
KR 10-2016-0024124 A 3/2016
(Continued)

*Primary Examiner* — Dmitry Suhol
*Assistant Examiner* — Alyssa N Brandley
(74) *Attorney, Agent, or Firm* — Rabin & Berdo, P.C.

(57) ABSTRACT

The present invention relates to a virtual reality-based task-oriented gait training system and method, in which the virtual reality-based task-oriented gait training system according to the present invention includes a gait detection unit that detects a walking movement of a trainee, a projector unit that projects virtual walking environment information for inducing a gait training of the trainee, and a control unit that executes a walking training program to change the virtual walking environment information according to the detected walking movement of the trainee, in which the virtual walking environment information includes a background constructing a virtual space and a walking training object appearing in the virtual space, and the gait training object includes a virtual obstacle for disturbing the walking movement of the trainee according to a preset level of difficulty or a gait inducing object for inducing gait of the trainee with a predetermined stride length. According to the present invention, there is an advantage that the trainee can perform gait training with interest and receive trainee-customized treatments through real-time interaction in vir- (Continued)

tual reality implemented closer to a real ground walking environment.

15 Claims, 12 Drawing Sheets

(58) Field of Classification Search
USPC .......................................................... 434/255
See application file for complete search history.

(56) References Cited

U.S. PATENT DOCUMENTS

| | | | | |
|---|---|---|---|---|
| 2014/0276130 A1* | 9/2014 | Mirelman | ............ | A61B 5/1104 |
| | | | | 600/595 |
| 2015/0140534 A1* | 5/2015 | Brunner | ............. | A63B 69/0053 |
| | | | | 434/255 |
| 2019/0150792 A1* | 5/2019 | Nakashima | ........... | A61B 5/1128 |

FOREIGN PATENT DOCUMENTS

| | | | |
|---|---|---|---|
| KR | 20160024124 A | * | 3/2016 |
| KR | 10-2016-0061557 A | | 6/2016 |
| KR | 20160061557 A | * | 6/2016 |
| KR | 10-1837142 B1 | | 3/2018 |
| KR | 10-2018-0041880 A | | 4/2018 |
| KR | 20180041880 A | * | 4/2018 |
| WO | WO-2018117593 A1 | * | 6/2018 ............. A63B 21/00 |

\* cited by examiner

VIRTUAL REALITY-BASED GROUND GAIT TRAINING SYSTEM AND METHOD

TECHNICAL FIELD

The present invention relates to a virtual reality-based task-oriented gait training system and method.

BACKGROUND ART

The problem with the existing gait training is that physical therapy in palliative care repeats similar treatment methods in a limited treatment room, and that the quality of treatment depends on the therapist's competence. While the treadmill gait training provides repeated gait training, it is not interesting enough for children and also different from the real walking environment. Robot-assisted gait training involves use of expensive equipment, and applications of the robot are limited by the physical condition of a child (leg length, foot size, weight, or the like).

Meanwhile, the related virtual reality technology is mostly used for sport activities and play activity contents, and is mostly used based on the treadmill. There are insufficient exercise systems that are capable of real-time interaction between the real environment and virtual reality, and insufficient researches on virtual reality-related technologies for gait training of children with disabilities.

DETAILED DESCRIPTION OF THE INVENTION

Technical Problem

Accordingly, a technical object of the present invention is to provide a virtual reality-based task-oriented ground gait training system and method.

Technical Solution

In order to solve the technical problems described above, a virtual reality-based gait training system according to the present invention may include a gait detection unit that detects a walking movement of a trainee, a projector unit that projects virtual walking environment information for inducing a gait training of the trainee onto the ground, and a control unit that executes a gait training program to change the virtual walking environment information according to the detected walking movement of the trainee.

The virtual walking environment information may include a background constructing a virtual space, and a gait training object appearing in the virtual space.

The gait training object may include a virtual obstacle for disturbing the walking movement of the trainee according to a preset level of difficulty, or a gait inducing object for inducing gait of the trainee with a predetermined stride length.

The system may further include a moving object moving according to the movement of the trainee.

The gait detection unit and the projector unit may be mounted on the moving object.

The moving object may move ahead of the trainee while maintaining a predetermined distance from the trainee in a front area in the walking direction of the trainee.

A degree of stride length training may be adjusted by adjusting a spacing between gait inducing objects, a size of the gait inducing object, and a pattern of appearing of the obstacle may be adjusted according to a preset level of difficulty.

The gait inducing object may be a stepping stone, and the virtual walking environment information may include a stepping stone bridge formed of a plurality of stepping stones.

The virtual walking environment information may include a virtual image for inducing gait of the trainee in a predetermined section at predetermined walking speed or higher, and the predetermined walking speed and the pattern of appearing of the obstacle may be adjusted according to a preset level of difficulty.

The virtual image may be a crosswalk.

The virtual walking environment information may include a curved walking path section for inducing gait of the trainee in curved pattern, and a number of curved walking path sections and curvature, and the pattern of appearing of the obstacle may be adjusted according to a preset level of difficulty.

The gait detection unit may recognize the central axes of both ankles of the trainee and both feet parts to classify and detect the left and right feet, and detect the bending shape of the left and right ankles to estimate the footprint pattern.

The estimating the footprint pattern may include using a footprint pattern estimation model machine-learned with training data constructed by databasing gait pattern images of a plurality of trainees.

The footprint pattern estimation model may be trained by supervised learning using training data obtained by extracting and databasing foot pattern features detected from the gait pattern images of a plurality of trainees, so as to output the trainee's gait pattern as one of gait patterns including equinus gait, crouch gait, flatfoot gait, and bell gait.

Based on a location of a footprint of one foot detected at the gait detection unit, the control unit may project a footprint pattern of the other foot for a next gait guide onto a predetermined location according to a level of training difficulty of the trainee.

Based on a location of a footprint of one foot detected at the gait detection unit, the control unit may project a footprint pattern of the other foot for a next gait guide onto a predetermined location between the trainee and the moving object according to a level of training difficulty of the trainee.

The control unit may execute a gait training program that induces a change from the detected abnormal gait pattern into a normal gait pattern.

When illuminance of a projection surface on which the virtual walking environment information is projected is equal to or greater than a predetermined reference, and when a floor pattern of the projection surface is more complicated than a predetermined reference, the control unit may process a background color of the virtual walking environment information with a solid color relatively darker than a floor, and process a gait training object with a complementary color contrasting with the background color.

When the illuminance of the projection surface on which the virtual walking environment information is projected is equal to or greater than the predetermined reference, and when the floor pattern of the projection surface is not complicated than the predetermined reference, the control unit may process the background color of the virtual walking environment information with a solid color relatively brighter than the floor, and process the gait training object with a complementary color contrasting with the background color.

The control unit may convert the virtual walking environment information by applying a higher compression rate and project the same, as a distance projected from the projector unit to the ground increases.

The control unit may cause a predetermined portion of the gait inducing object to be displayed darker than the other portions.

In order to solve the technical problems described above, a virtual reality-based gait training the method according to the present invention may include setting a level of difficulty of a gait training program, projecting virtual walking environment information for inducing a gait training of a trainee, detecting a walking movement of the trainee, and executing a gait training program to change the virtual walking environment information according to the detected walking movement of the trainee.

Effects of Invention

According to the present invention, there is an advantage that the trainee can perform gait training with interest and receive trainee-customized treatments through real-time interaction in virtual reality projected on the ground, which is implemented close to an actual walking environment.

MODE FOR EMBODYING INVENTION

Hereinafter, embodiments of the present invention will be described in detail with reference to the accompanying drawings to assist those with ordinary knowledge in the art to which the present invention belongs to easily achieve the present invention.

Figure 1:
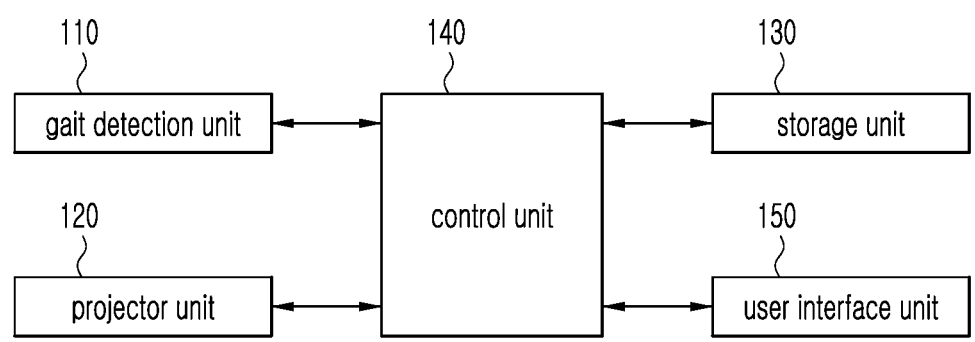
FIG. 1 is a diagram illustrating a configuration of a virtual reality-based gait training system according to an embodiment of the present invention.

FIG. 1 is a diagram illustrating a configuration of a virtual reality-based gait training system according to an embodiment of the present invention.

Referring to FIG. 1, the virtual reality-based gait training system 100 according to the present invention may include a gait detection unit 110, a projector unit 120, a storage unit 130, a control unit 140, and a user interface unit 150.

The gait detection unit 110 may detect a walking movement of a trainee performing gait training. The gait detection unit 110 may use a Lidar sensor. In addition, the gait detection unit 110 may be provided with Kinect RGB camera, IR emitter, IR depth sensor, or the like so as to be implemented as a device that can recognize movement of a user. The gait detection unit 110 may also be implemented as the other devices not described herein, which can detect the walking movement of a trainee performing gait training.

The projector unit 120 may project virtual walking environment information for inducing the gait training of the trainee. The projector unit 120 may include a projection device that projects information such as photos, pictures, texts or the like to a predetermined location with the light emitted from a light source.

In this embodiment, the virtual walking environment information may include a background constructing a virtual space, and a gait training object appearing on the background. For example, the gait training object may include a virtual obstacle designed to be avoided by the trainee, or a gait inducing object such as a footstep or a stepping stone and the like to induce gait of the trainee following the same. The virtual walking environment information will be described in more detail below with reference to an embodiment.

Figure 2:
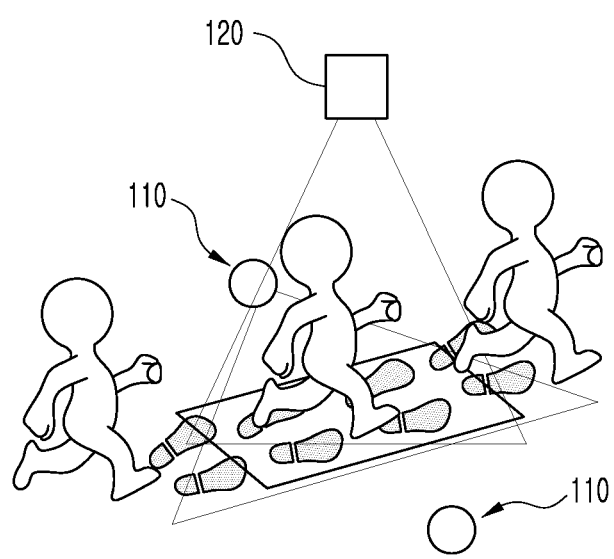
FIGS. 2 to 4 are diagrams illustrating how virtual walking environment information is projected according to the present invention.
Figure 3:
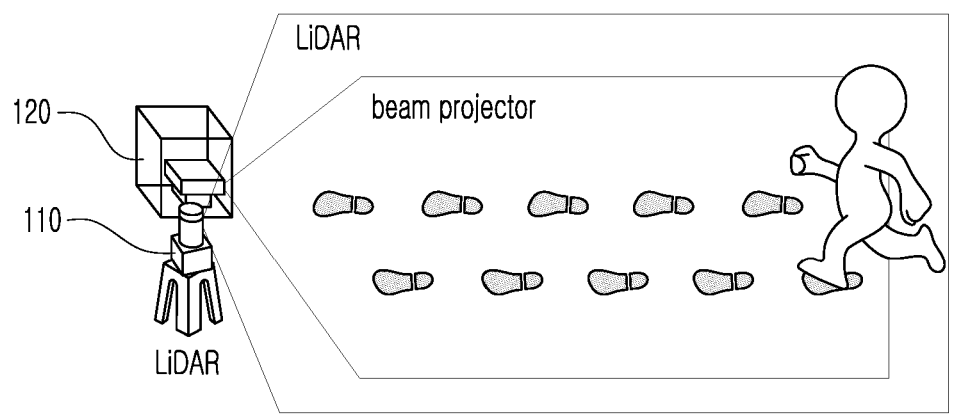
Figure 4:
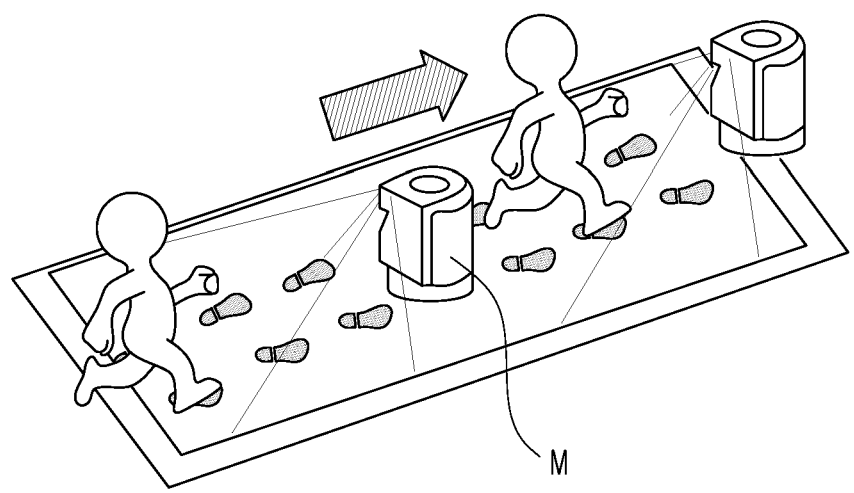

FIGS. 2 to 4 are diagrams illustrating how virtual walking environment information is projected according to the present invention.

Referring to FIG. 2, the projector unit 120 may be installed to project virtual walking environment information from above toward the floor in a space where the trainee is walking. In addition, the gait detection unit 110 may detect the walking movement of the trainee through the Lidar sensors or Kinect installed on both sides of the gait training path.

Referring to FIG. 3, the gait detection unit 110 and the projector unit 120 may be installed in front of the trainee. The gait detection unit 110 may detect a movement of the trainee walking forward. Further, the projector unit 120 may project the virtual walking environment information to the front floor in the trainee's walking direction.

Referring to FIG. 4, the gait detection unit 110 and the projector unit 120 may be mounted on a moving object M that moves according to the movement of the trainee. The moving object M is a mobile robot including wheels, and so on, and may move by determining moving direction and moving speed according to the walking movement of the trainee detected by the gait detection unit 110. For example, while maintaining a predetermined distance from the trainee, the moving object M may project the virtual walking environment information to the training space in the front area in the trainee's walking direction.

In addition to the examples illustrated in FIGS. 2 to 4, the gait detection unit 110 and the projector unit 120 may also be installed and managed in the gait training space.

Figure 5:
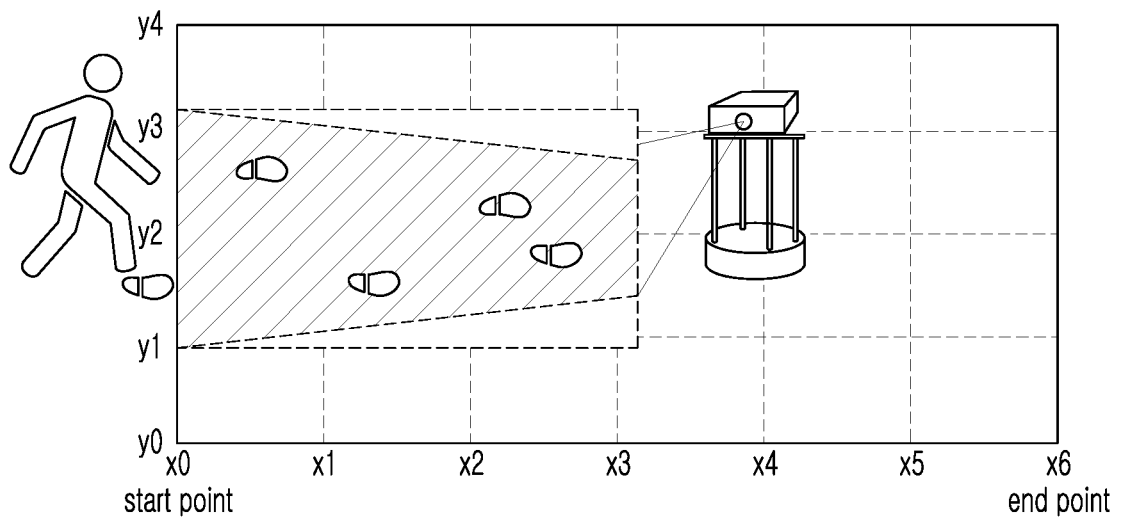
FIG. 5 illustrates an example of walking environment information distorted and expressed on the ground in an uncorrected state, according to an embodiment of the present invention.

Meanwhile, for example, when walking environment information in a rectangular shape is projected on the ground in an oblique line from the projector unit 120 as illustrated above in FIGS. 3 and 4, it may be distorted and displayed in a trapezoidal shape in which a farther side from the projector unit 120 is longer than the nearer side, as illustrated in FIG. 5.

Figure 6:
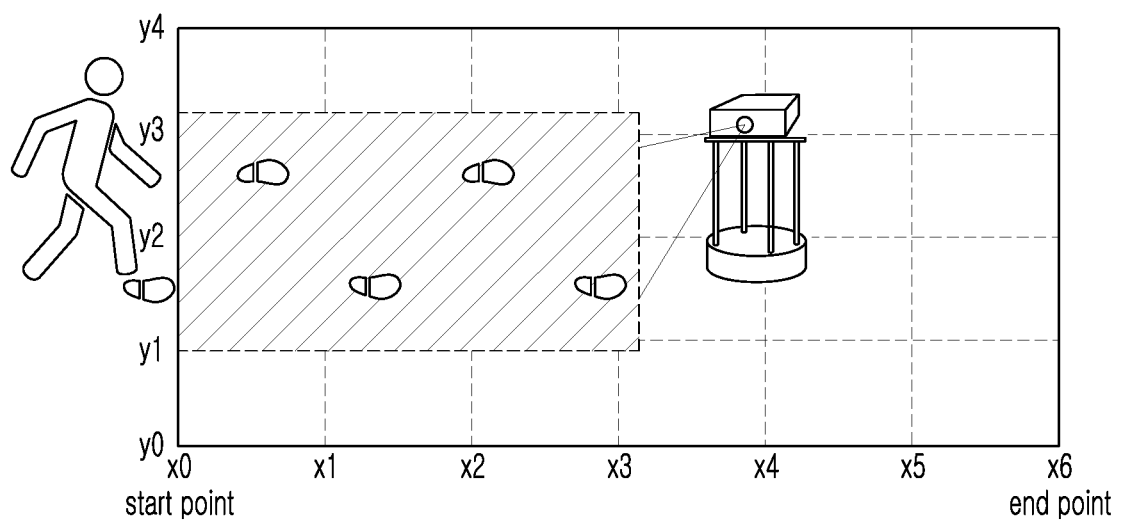
FIG. 6 illustrates an example of walking environment information corrected and expressed without distortion on the ground, according to an embodiment of the present invention.

In order to solve this problem, it is desirable that the control unit 140 converts the walking environment information by applying a higher compression ratio as the distance projected on the ground from the projector unit 120 increases, and transmits the converted walking environment information to be projected on the ground. For example, in case of the walking environment information in the rectangular shape described above, the control unit may compress and convert it into an inverted trapezoid in which the farther side from the projector unit 120 is shorter than the nearer side, and transmit the result to the projector unit 120. Then, as illustrated in FIG. 6, the walking environment information may be displayed on the ground without distortion.

Referring to FIG. 1 again, the storage unit 130 may store various data and programs related to the operation of the system 100. The storage unit 130 may include a storage device such as hard disk, RAM, ROM, and the like. Specifically, the storage unit 130 may store a gait training program. Further, the storage unit 130 may store the trainee's personal information and gait training information. The personal information may include identifier, gender, date of birth, height, weight, diagnosis, GMFCS level, onset date, or the like. Further, the gait training information may include training name, training date and time, training duration, level of difficulty, success rate, step length, step width, walking speed, walking distance, walking symmetry, or the like.

The control unit 140 controls the overall operation of the system 100. The control unit 140 may execute a gait training program to change the virtual walking environment information according to the walking movement of the trainee detected at the gait detection unit 110, and cause a virtual obstacle to appear in the virtual walking environment information to disturb the walking movement of the trainee according to a preset level of difficulty.

The user interface unit 150 may output various types of information related to the operation of the system 100. For example, the user interface unit 150 may output the trainee's personal information, gait training information, or the like. In addition, the user interface unit 150 may receive various commands or settings related to the operation of the system 100. For example, the user interface unit 150 may receive the trainee's personal information or may receive selected training type, selected level of training difficulty, or the like from a user. The user interface unit 150 may include an input/output module such as a monitor, a speaker, a touch panel, a mouse, a keyboard, or the like.

Figure 7:
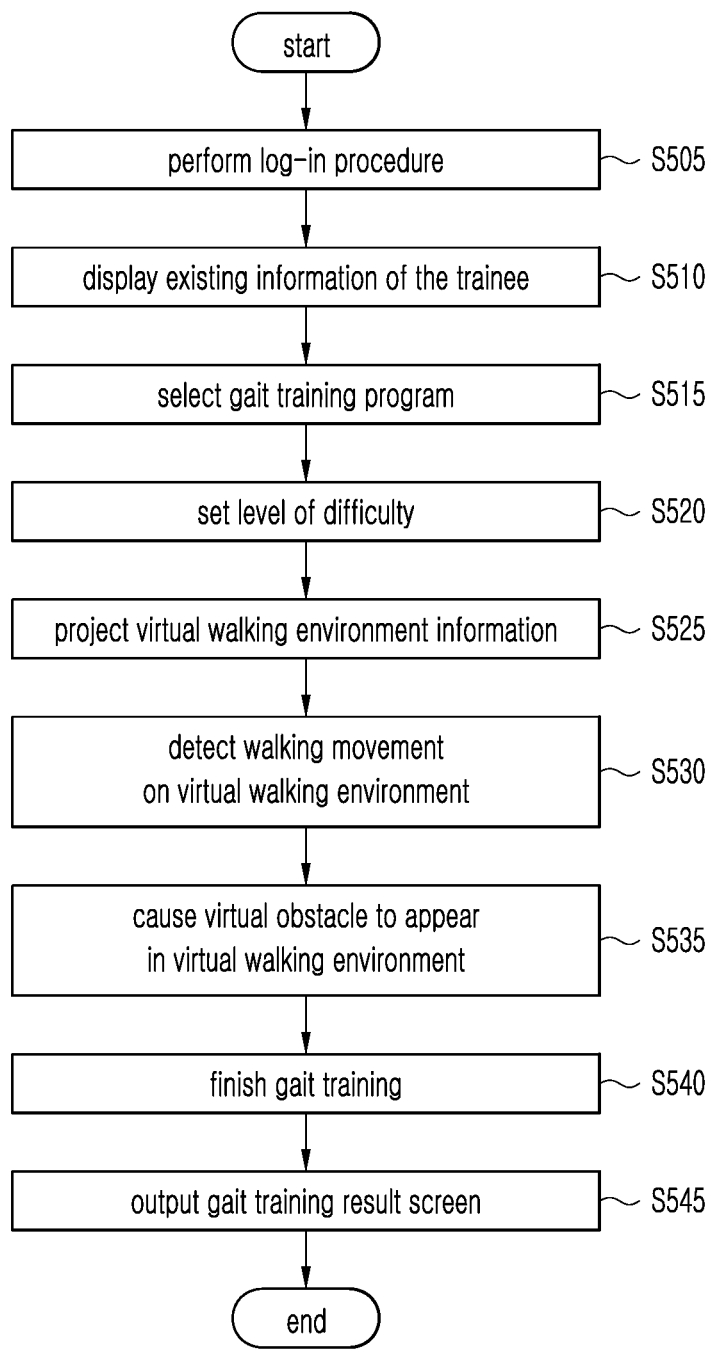
FIG. 7 is a flowchart illustrating a gait training method by a virtual reality-based gait training system, according to an embodiment of the present invention.

FIG. 7 is a flowchart illustrating a gait training method by a virtual reality-based gait training system, according to an embodiment of the present invention.

Referring to FIGS. 1 and 7, the system 100 may first perform a log-in procedure for the trainee at S505, and display existing information of the trainee who logged in, through the user interface unit 150 at S510. In this example, the trainee's existing information may include personal information of the trainee registered in the system 100 and information on the gait training performed by the trainee in the past.

At S515, the system 100 may receive a selected gait training program from the trainee or a therapist who selects the same after checking the existing information at S510. The gait training program that can be selected at S515 may include stride length training, walking speed training, and curved gait training.

Figure 8:
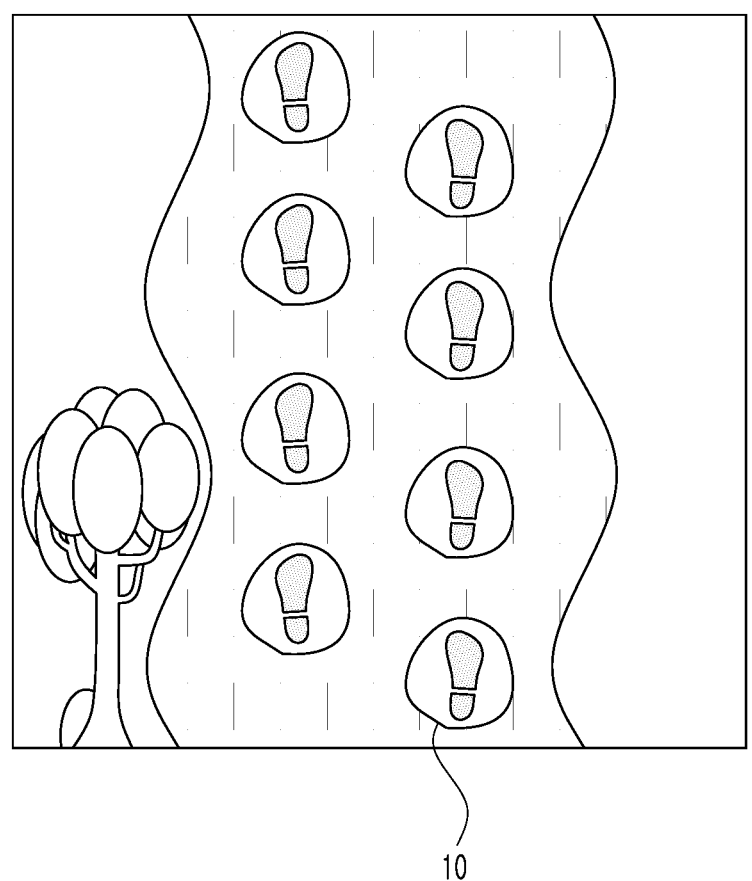
FIG. 8 is a diagram illustrating virtual walking environment information for stride length training according to an embodiment of the present invention.

The gait training program for stride length training may cause a virtual image to be projected, including the gait inducing object 10 for inducing gait of the trainee with a predetermined stride length as illustrated in FIG. 8. FIG. 6 illustrates a virtual walking environment provided such that the trainee can feel as if he or she is crossing on a stepping stone bridge formed of a plurality of stepping stones 10.

Figure 9:
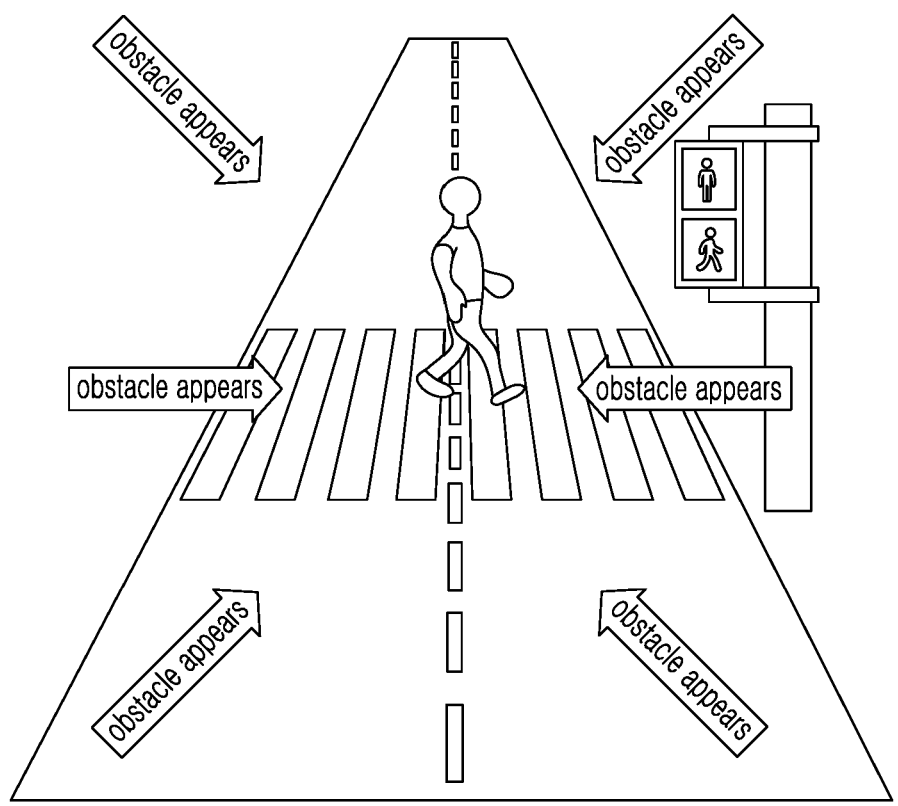
FIG. 9 is a diagram illustrating virtual walking environment information for walking speed training according to an embodiment of the present invention.

The gait training program for walking speed training may cause a virtual image to be projected to induce gait of the trainee in a predetermined section at predetermined walking speed or higher, as illustrated in FIG. 8. FIG. 9 illustrates a virtual walking environment provided, in which the trainee can feel as if he or she is crossing a crosswalk in which a traffic light is installed.

Figure 10:
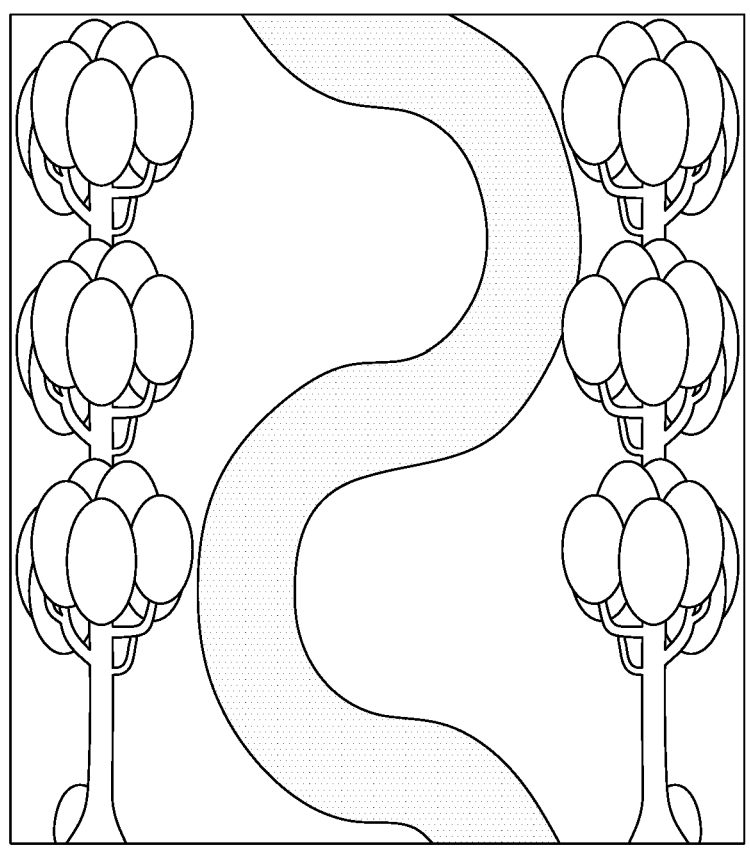
FIG. 10 is a diagram illustrating virtual walking environment information for curved gait training according to an embodiment of the present invention.

The gait training program for curved gait training may cause a virtual image such as a forest trail including a curved walking path section to be projected, to induce gait of the trainee in curved pattern as illustrated in FIG. 10.

Referring to FIG. 7 again, after the type of gait training program is selected by the user at S515, the level of difficulty of the selected gait training program may be set at S520.

For example, for the stride length training program illustrated in FIG. 8, the level of difficulty may be set differently by adjusting spacing between the stepping stones 10, size of the stepping stones 10, pattern of appearing of the obstacles, and so on. For example, the spacing between the stepping stones 10 may be adjusted, and this may increase the step length and decrease the step width, which are characteristics of a child's gait development. For example, as the level of difficulty increases, the spacing between the stepping stones in the same row may be adjusted to increase and the spacing between rows may be adjusted decrease. Further, in order to enhance accuracy of the trainee's foot location, the level of difficulty may be adjusted to a higher degree by reducing the size of the stepping stones 10. The level of difficulty may also be adjusted by way of disturbing the trainee from concentrating on walking, by showing a virtual image of obstacles such as fish jumping out of the water, flying birds and so on that interfere with the walk of the trainee crossing on the stepping stones, or by generating ambient sounds. According to some embodiments, the level of difficulty may be adjusted by setting a time limit to cross on the stepping stones.

In the walking speed training program illustrated in FIG. 9, the level of difficulty may be set by setting the time of crossing a crosswalk. Further, the level of difficulty may also be set by using the presence or absence of virtual obstacles such as people, bicycles, strollers, wheelchairs, or the like that appear as the trainee crosses the crosswalk, direction in which the virtual obstacles appear, number of appearances, moving speed, or the like. That is, a higher level of difficulty can be set by setting a longer crossing time, and the level of difficulty may also be set to be higher by increasing the number and types of obstacles, direction of appearance, speed, or the like. The level of difficulty may also be set by setting the presence or absence of occurrence of ambient sound such as sound of a vehicle horn, number of occurrences, volume of the sound, or the like.

In the walking speed training program illustrated in FIG. 10, the level of difficulty may be set by setting number of curved walking path sections, curvature, or the like. Further, the level of difficulty may also be set by using the presence or absence of virtual obstacles such as animals, flying birds, or the like that appear as the trainee walks along a trail, direction in which the virtual obstacles appear, number of appearances, moving speed, or the like. The level of difficulty may also be set by setting the presence or absence of occurrence of ambient sound such as animal sound, number of occurrences, volume of the sound, or the like.

Referring to FIG. 7 again, after setting the level of difficulty of the gait training program at S520, the system 100 may execute the selected gait training program to project virtual walking environment information for inducing the gait training of the trainee to a gait training space through the projector unit 120, at S525.

The system 100 may detect the walking movement of the trainee in the virtual walking environment through the gait detection unit 110 at S530.

The system 100 may change the virtual walking environment information according to the detected walking movement of the trainee, and may cause a virtual obstacle to appear in the virtual walking environment information to disturb the walking movement of the trainee according to a preset level of difficulty at S535.

The operations at S525 to S535 may be performed concurrently while the gait training program is being executed. In addition, while executing the operations at S525 to S535, the system 100 may also provide visual, auditory, and tactile feedbacks according to a progression of the gait training of the trainee. For example, in the embodiment of FIG. 9, the visual, auditory, and tactile feedbacks may be provided each time the trainee steps on the stepping stone 10 accurately. Further, the feedbacks may be provided in response to successfully crossing the crosswalk in FIG. 9 without bumping into obstacles within a predetermined time, or successfully crossing the crosswalk in FIG. 10 without going astray from the curved section of the forest trail. In addition to the examples illustrated herein, a corresponding feedback may be provided when a condition preset in the training program is met. Of course, the feedback may also be provided to inform it in case of failure.

Next, when the gait training according to the selected gait training program is completed at S540, a gait training result screen may be output through the user interface unit 150 at S545. Of course, the gait training result may be stored in the storage unit 130 as pedestrian training information.

Meanwhile, in the gait training system 100 according to the present invention, the gait detection unit 110 may support an algorithm for classifying and detecting the left and right feet of the trainee (e.g., method of attaching markers to the left and right feet, method of detecting the shape of the foot (shapes of left and right feet) by analyzing the captured image of the trainee through software, method of performing a calibration to allow the left and right feet to be recognized in the gait training system 100 before training). Alternatively, the gait detection unit 110 may classify and detect the left and right feet by way of recognizing the left and right feet with respect to the central axis of the trainee's trunk and the ankle axes of both legs during training. For example, when using the Lidar sensor, the left and right feet may be recognized with respect to the ankle axes of both legs.

Figure 11:
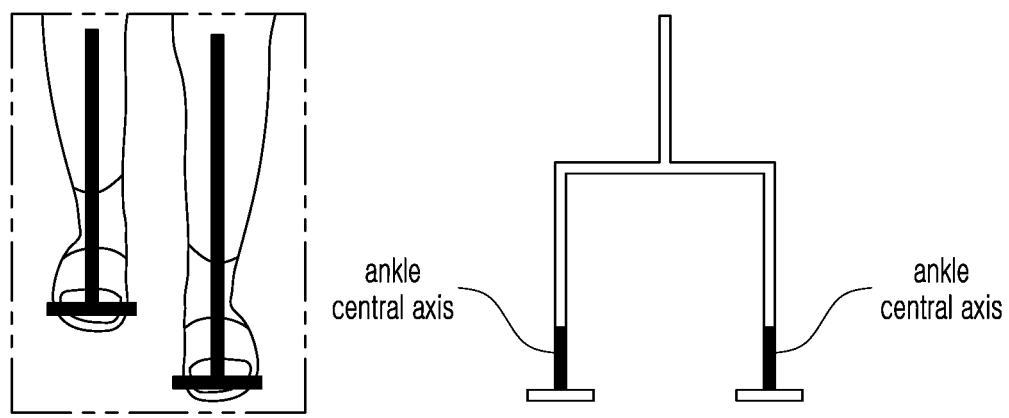
FIG. 11 is a diagram provided to explain an algorithm for classifying left and right feet according to an embodiment of the present invention.
Figure 11:
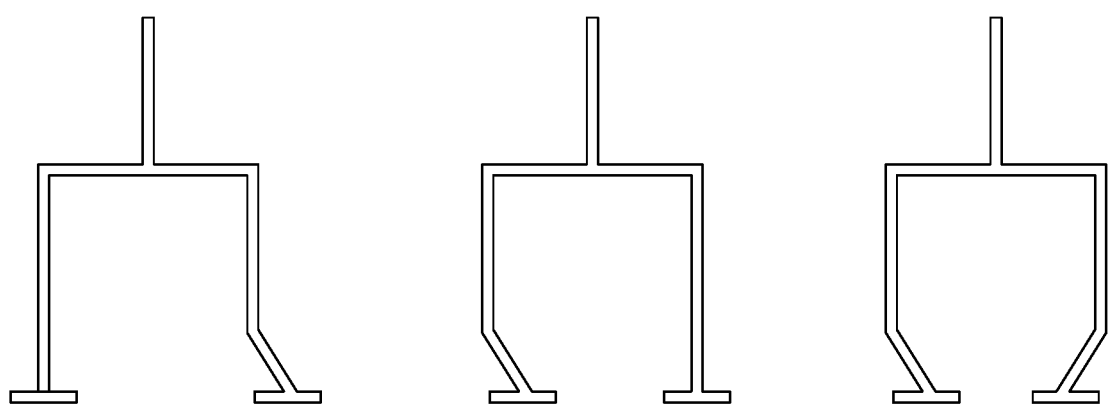

FIG. 11 is a diagram provided to explain an algorithm for classifying left and right feet according to an embodiment of the present invention.

Referring to FIG. 11, the gait detection unit 110 may recognize the central axes of both ankles of the trainee and both feet parts to classify and detect the left and right feet. In addition, the bending shape or the like of the left and right ankles may also be classified and detected.

Figure 12:
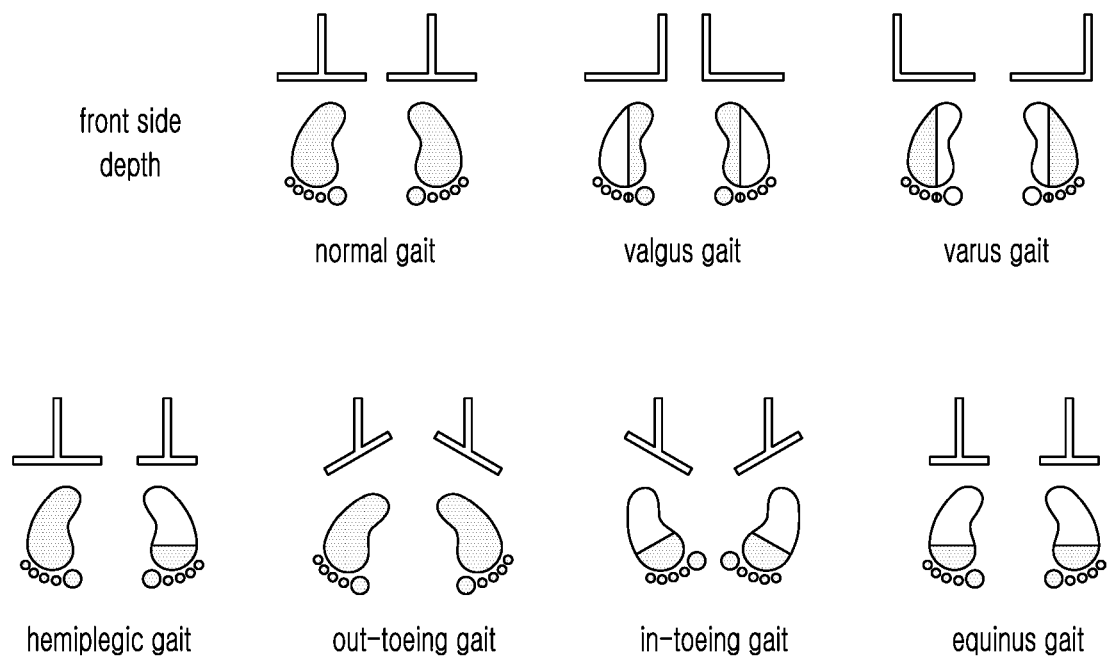
FIG. 12 is a diagram provided to explain an algorithm for classifying footprint pattern according to an embodiment of the present invention.

FIG. 12 is a diagram provided to explain an algorithm for classifying footprint pattern according to an embodiment of the present invention.

Referring to FIG. 12, with respect to the left and right feet and the bending left and right ankles which are detected as shown in FIG. 11, the gait detection unit 110 may classify and detect the footprint pattern of the trainee and its corresponding gait pattern by referring to data of footprint patterns associated with normal gait, valgus gait, varus gait, hemiplegic gait, out-toeing gait, in-toeing gait, equinus gait or the like. In FIG. 12, areas in blue indicate surfaces on which the sole of the foot is in contact with the ground.

To this end, the gait detection unit 110 may extract features of the foot pattern detected by a 3D depth sensor, or the like, convert it into database (DB), label the footprint pattern through supervised learning, and categorize the corresponding gait patterns into equinus gait, crouch gait, flatfoot gait, and bell gait.

That is, the gait detection unit 110 may recognize the central axes of both ankles of the trainee and both feet parts to classify and detect the left and right feet, and detect the bending shape of the left and right ankles to estimate the footprint pattern.

The control unit 140 may compare the estimated footprint pattern with a normal gait pattern to distinguish an abnormal gait pattern.

Herein, the footprint pattern estimation may use a machine-learned footprint pattern estimation model with learning data which is constructed by converting the gait pattern images of a plurality of trainees into database. In addition, the footprint pattern estimation model may be trained by supervised learning using the training data obtained by extracting and databasing foot pattern features detected from the gait pattern images of a plurality of trainees, so as to output the trainee's gait pattern as one of gait patterns including equinus gait, crouch gait, flatfoot gait, and bell gait.

For reference, children with cerebral palsy have abnormal gait patterns depending on the lesion. For example, in case of equinus gait or crouch gait, most of the stance phase during the gait cycle is supported by the forefoot, and in case of flatfoot gait or bell gait, it is difficult to lift off the toes while walking due to weakness of the plantar flexor muscle. Further, in case of ankle varus and valgus, due to deformation, the pressure is concentrated to a certain side because it is impossible to support the weight through the entire foot, and in case of in-toeing and out-toeing gait, the foot moves inward or outward excessively compared to the normal cases while walking. Therefore, in order to develop a gait training system, it is necessary to detect such various gait patterns.

The control unit 140 may execute a gait training program to change the virtual walking environment information according to the gait pattern of the trainee detected at the gait detection unit 110, and cause a virtual obstacle to appear in the virtual walking environment information to disturb the walking movement of the trainee according to a preset level of difficulty.

For example, in case of in-toeing and out-toeing gaits, the training may be performed by displaying the sole of the foot at the normal gait location. When performing hemiplegic gait, stages may be set and the virtual walking environment information may be projected accordingly. For example, the level of difficulty may be adjusted such that the projecting and detecting may be performed by targeting 50% of the normal foot location at stage 1, 70% at stage 2, and 90% at stage 3. When it is necessary to adjust the step length including scissors gait, the level of difficulty may be adjusted such that the virtual walking environment information may be projected so that the step length can be increased step by step.

Meanwhile, when recognizing that the trainee steps on the projected foot shape included in the virtual walking environment information by a certain ratio, e.g., by ⅓ or more, the control unit 140 may change the projected foot shape into a picture of candy or other images with rewarding effects, or the like to provide a reward to the trainee. Further, training duration, level of difficulty, success rate, step length, step width, walking speed, walking distance, walking symmetry, feet alternating time, correct number of walk steps or the like may be compared with preset goal values, and corresponding rewarding effect may be provided upon achieving the goal is achieved.

Meanwhile, the control unit 140 may cause a gait guide footstep shape to be projected to inducing a change from the abnormal gait pattern (e.g., equinus gait, crouch gait, or the like) of the trainee toward a normal gait pattern. For example, in order to guide the next walk based on the location of the left or right footprint of the trainee detected by the gait detection unit 110, the shape of the opposite footprint may be projected to a certain location according to the level of training difficulty for the trainee. For example, it may be projected to a certain location between the trainee and the moving object M according to the level of training difficulty.

Meanwhile, as illustrated in FIG. 4, when the gait detection unit 110 and the projector unit 120 are mounted on a moving object M that moves according to the movement of the trainee to maintain a certain distance from the trainee, the moving object M may be advanced in a direction in front of the trainee in synchronization with the trainee's walking speed.

Figure 13:
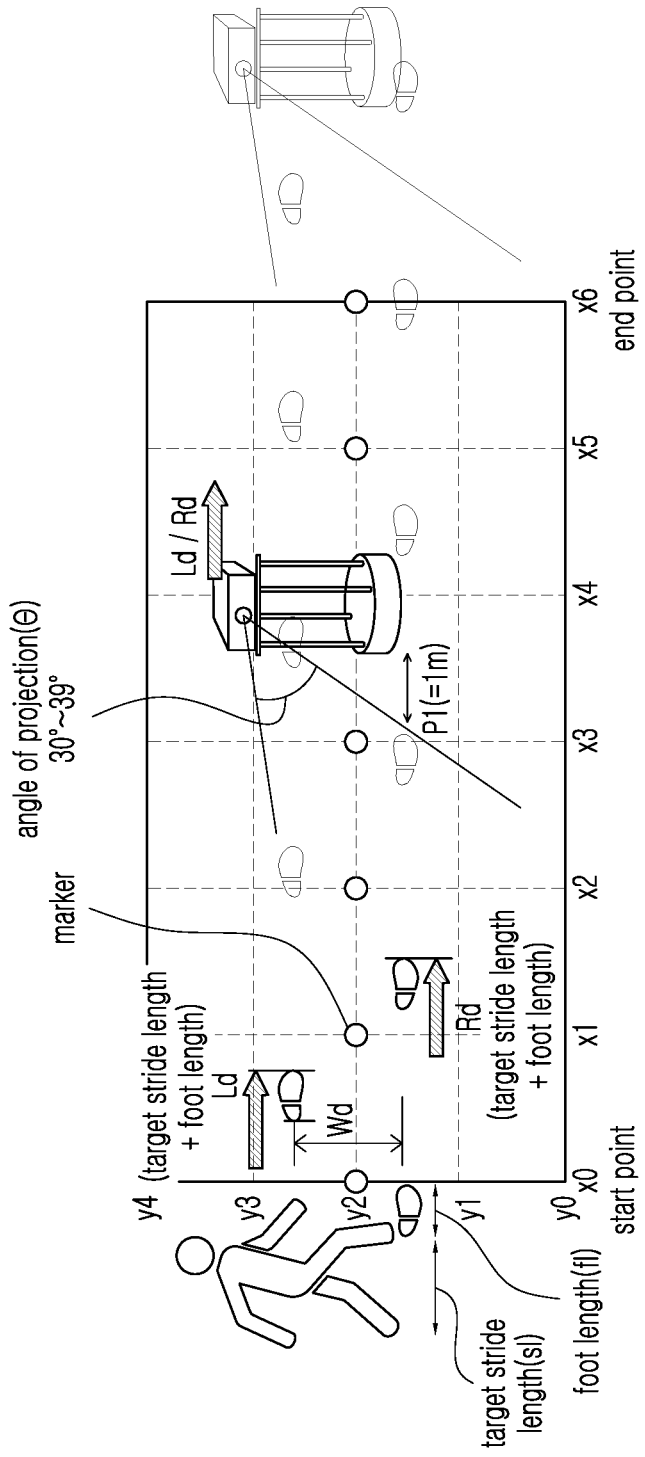
FIG. 13 is a diagram provided to explain an absolute coordinate-based algorithm for maintaining a constant distance between a trainee and a moving object according to an embodiment of the present invention.
Figure 14:
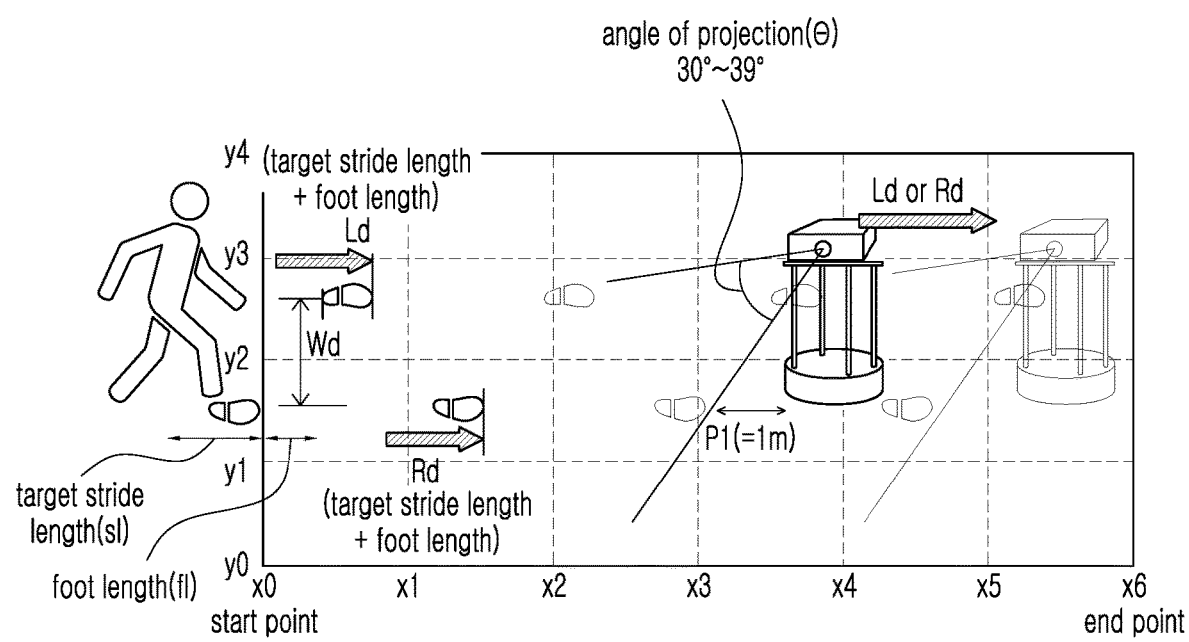
FIG. 14 is a diagram provided to explain a relative coordinate-based algorithm for maintaining a constant distance between a trainee and a moving object according to an embodiment of the present invention.

FIG. 13 is a diagram provided to explain an absolute coordinate-based algorithm for maintaining a constant distance between the trainee and the moving object according to an embodiment of the present invention, and FIG. 14 is a diagram provided to explain a relative coordinate-based algorithm for maintaining a constant distance between the trainee and the moving object according to an embodiment of the present invention.

Referring to FIGS. 13 and 14, in both absolute and relative coordinate algorithms, a gait training object such as a footprint may be projected within a certain distance ($P_{int}$=P1(1 m)+PJ(=2Ld+2Rd)) between the projected trainee and the moving object M. The gait training object may be projected to a location separated by P1 away from the moving object M in consideration of the distance P1 determined according to the projection angle Θ and the safety distance with the trainee (LS=PJ). The gait training object projected on the floor such as the ground may be projected according to the target stride length Sl and the foot length fl which are input by the therapist before training.

$P_{int}$: distance between trainee and moving object
PJ: projection screen distance
Ld: target stride length+foot length of left foot
Rd: target stride length+foot length of right foot
Θ: angle of projection
P1: distance between moving object and start point of gait training object projection
Ls: safe distance
sl: target stride length
fl: foot length An absolute coordinate algorithm will be described with reference to the embodiment of FIG. 13.

(Absolute Coordinate Algorithm) In 6 M training space, coordinates may be set by placing markers (e.g., infrared reflective markers) on the training start and end points, and placing markers in each 1 m if necessary in order to enhance accuracy. In order to detect the coordinates (Ld/Rd) of the location to which the trainee has moved forward and maintain a certain distance, the moving object M may move back by Ld/Rd and project foot alternating content which is the gait training object.

Location of the moving object M: ($x_m$, $y_m$)
Projection point: ($x_m$, $y_m$)-(1 m-$x_m$)
Current coordinates of distance traveled by trainee:

$$x_m = \left| \frac{x_R + x_L}{2} \right|$$

No change in $y_R+y_L$ in case of straight line gait training

Meanwhile, according to the target stride length Sl and the foot length fl input by the therapist in FIG. 13, it may be possible to set the number of footprints at 6 m distance. The moving object M may identify the location of the moving object by utilizing a Kinetic sensor mounted on the moving object by ToF sensing based on the market at the starting point (by checking how many markers are present before the moving object based on the market at the starting point). In this example, the ToF sensing technique emits an infrared laser signal from a transmitter and measures the time for the signal to reflect off from the subject and return to a receiver.

A relative coordinate algorithm will be described with reference to the embodiment of FIG. 14.

(Relative Coordinate Algorithm) In 6 M training space, the moving object M may detect the distance by which the trainee has moved forward (Ld/Rd), move back by that distance (Ld/Rd) while maintaining a certain distance, and project the foot alternating content.

Moving object (mobile robot) moving point: 2 $L_d$+$P_{int}$

It should be understood that the numerical values shown in FIGS. 13 and 14 are only examples, and numerical values may be adjusted according to embodiments and conditions of training circumstances.

Meanwhile, children or the like may not be able to perceive that they have to step on the gait training object expressed in shapes such as footsteps or the like, and in this case, motivating pictures may be displayed on the footprints (e.g., candies, coins) to motivate them.

Meanwhile, when a trainee such as a child does not step on the gait training object for a certain period of time, a competitor content may appear and acquire the visual reward effects (e.g., candies, coins, or the like). Then, by displaying information on the rewards acquired by the competitor content and the trainee on the screen and comparing who acquired more reward effects between the trainee and the competitor after training is finished, the training effect may be enhanced.

Meanwhile, when the control unit 140 projects the virtual walking environment information on the floor, following processes may be performed according to the training environment.

Figure 15:
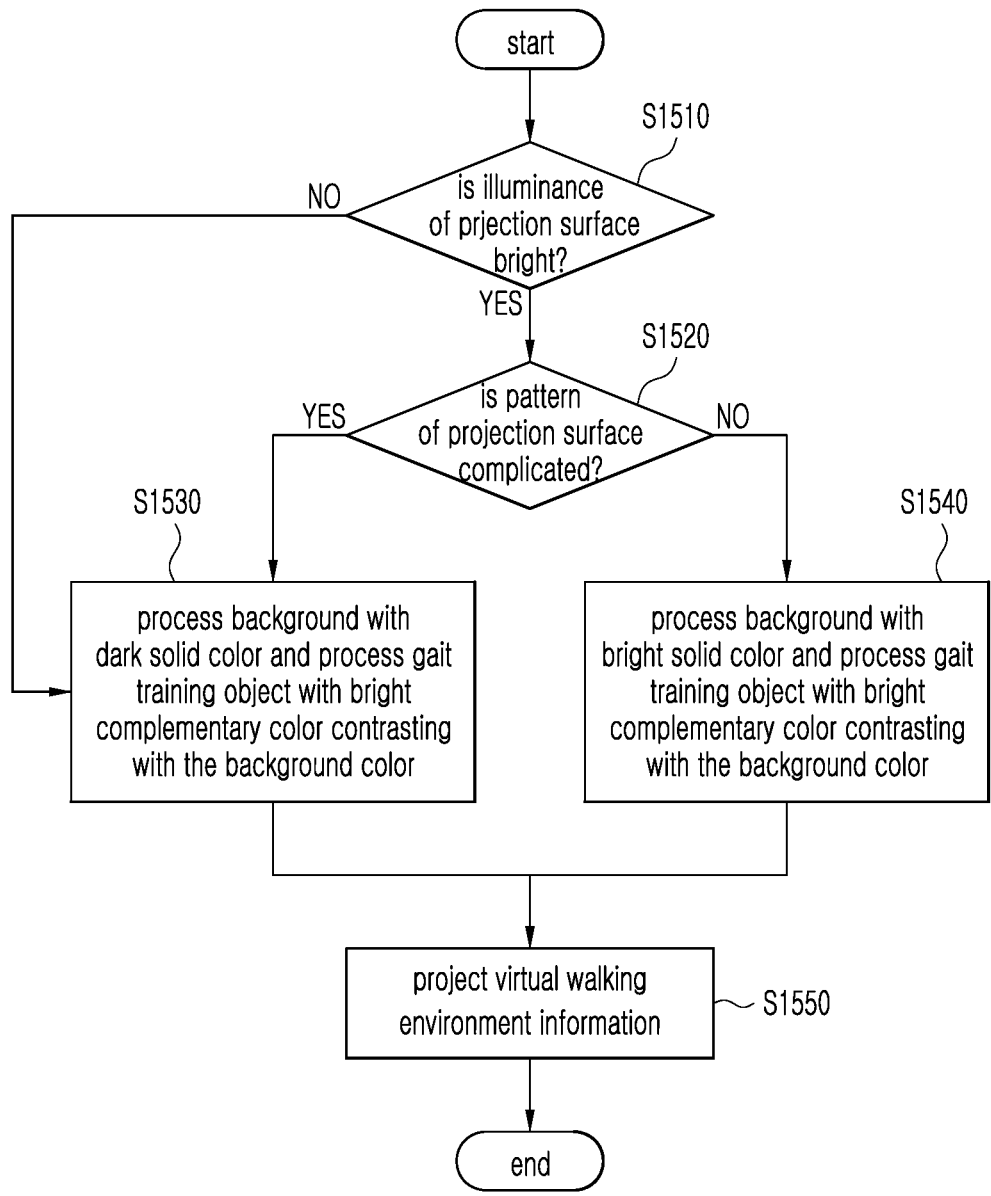
FIG. 15 is a diagram provided to explain a method for projecting virtual walking environment information in accordance with a training environment according to the present invention.

FIG. 15 is a diagram provided to explain a method for projecting virtual walking environment information in accordance with a training environment according to the present invention.

Referring to FIG. 15, the control unit 140 may first determine whether the illuminance of the projection surface (the floor on which the virtual walking environment information is projected) is brighter than predetermined reference at S1510. When the illuminance of the projection surface is equal to or greater than a predetermined reference at S1510-Y, it is determined whether or not the floor pattern of the projection surface is complicated at S1520. To this end, the virtual reality-based gait training system 100 may include an illuminance sensor or the like.

Further, when the floor pattern of the projection surface is more complicated than the predetermined reference at S1520-Y, the control unit 140 sets a background color of the virtual walking environment information as a relatively darker solid color (low brightness and low saturation) than the floor in order to cover the complicated floor pattern, and processes the gait training object (e.g., footprint shapes, stepping stones, or the like) with a bright color (high brightness and high saturation) as a complementary color contrasting with the background color at S1530.

On the contrary, when the projected floor pattern is not complicated at S1520-N, the control unit 140 processes the background color of the projected virtual walking environment information with a light color (high brightness and high saturation), and the gait training object with a dark color (low brightness and low saturation) as a complementary color contrasting with the background color at S1540.

Meanwhile, when the illuminance of the projection surface is less than a predetermined reference at S1510-N, the control unit 140 may perform the operation at S1530.

At S1550, training may be performed by projecting the virtual walking environment information including the background processed at S1530 or S1540 and the gait training object.

Meanwhile, the control unit 140 may variably adapt the virtual walking environment information including gait training inducing information or the like according to change of location of the virtual walking environment information projected from the projector unit mounted on the top of the moving object M according to the movement of the moving object M, signals from the gait detection unit that detects the trainee's gait, and the like.

Further, the control unit 140 may express a darker color for a predetermined part of the gait inducing object, e.g., the heel part or the toe part if the gait inducing object is in footprint shapes, and also express a sequence by numbers so that the heel part is first in contact at initial contact in case of equinus gait and crouch gait, or toes support the weight in the pre-swing phase in case of flatfoot gait or bell gait. Further, the gait inducing object may be projected so that a certain part of the gait inducing object corresponding to the medial part of the sole in case of varus deformation of the foot or the lateral part of the sole in case of valgus deformation of the foot may be displayed darker than other parts to support the weight on the marked part.

The embodiments of the present invention include a computer-readable medium including program instructions for performing various computer implemented operations. The medium records a program for executing the methods described above. The medium may include program instructions, data files, data structures, and so on, either alone or in combination. Examples of such medium include a magnetic medium such as hard disk, floppy disk and magnetic tape, an optical recording medium such as CD and DVD, a magneto-optical medium, and a hardware device configured to store and carry out program instructions, such as ROM, RAM, flash memory, and so on. Examples of program instructions include high-level language codes that may be executed by a computer using an interpreter, and so on as well as machine language codes such as those generated by a compiler.

While the preferred embodiments of the present invention have been described in detail above, it is to be understood that the scope of the present invention is not limited to the above, and that many variations and modifications that may be made by those skilled in the art based on the basic concept of the present invention will also fall within the scope of the present invention.

The invention claimed is:

1. A virtual reality-based task-oriented gait training system,
comprising:
a gait detection unit that detects a walking movement of a trainee;
a projector unit that projects virtual walking environment information for inducing a gait training of the trainee onto a projection surface corresponding to a ground; and
a control unit including a processor configured to execute instructions stored in a memory, the processor being operable to execute a gait training program to change the virtual walking environment information according to the walking movement of the trainee detected by the gait detection unit,
wherein
the virtual walking environment information includes a background constructing a virtual space, and a gait training object appearing in the virtual space, and
the gait training object includes at least one of a virtual obstacle for disturbing the walking movement of the trainee according to a preset level of difficulty and a gait inducing object for inducing a gait of the trainee with a predetermined stride length,
wherein the gait detection unit estimates a footprint pattern by recognizing central axes of both ankles of the trainee and both feet parts through analysis of data detected by a Lidar sensor, an RGB camera, or an IR depth sensor to classify and detect left and right feet, and detecting bending shapes of left and right ankles, and
the control unit compares the estimated footprint pattern with a normal gait pattern to discriminate an abnormal gait pattern,
wherein the estimating the footprint pattern includes using a footprint pattern estimation model machine-learned with training data constructed by databasing gait pattern images of a plurality of trainees, and
wherein the footprint pattern estimation model is trained by supervised learning using training data obtained by extracting and databasing foot pattern features detected from the gait pattern images of the plurality of trainees, so as to output the trainee's gait pattern as one of gait patterns including equinus gait, crouch gait, flatfoot gait, and bell gait.

2. The virtual reality-based gait training system of claim 1, further comprising a moving object that moves according to a movement of the trainee, wherein
the gait detection unit and the projector unit are mounted on the moving object.

3. The virtual reality-based gait training system of claim 2, wherein the moving object moves ahead of the trainee while maintaining a predetermined distance from the trainee in a front area in a walking direction of the trainee.

4. The virtual reality-based gait training system of claim 1, wherein a spacing between gait inducing objects, a size of the gait inducing object, and a pattern of appearing of the obstacle are adjusted according to the preset level of difficulty.

5. The virtual reality-based gait training system of claim 4, wherein the gait inducing object is a stepping stone, and
the virtual walking environment information comprises a stepping stone bridge formed of a plurality of stepping stones.

6. The virtual reality-based gait training system of claim 1, wherein the virtual walking environment information comprises a virtual image for inducing the gait of the trainee in a predetermined section at predetermined walking speed or higher, and
the predetermined walking speed and a pattern of appearing of the virtual obstacle are adjusted according to the preset level of difficulty.

7. The virtual reality-based gait training system of claim 6, wherein the virtual image is a crosswalk.

8. The virtual reality-based gait training system of claim 1, wherein the virtual walking environment information comprises a curved walking path section for inducing the gait of the trainee in a curved pattern, and
a number of curved walking path sections and curvature, and a pattern of appearing of the virtual obstacle are adjusted according to the preset level of difficulty.

9. The virtual reality-based gait training system of claim 1, wherein the control unit executes a gait training program that induces a change from the discriminated abnormal gait pattern into a normal gait pattern.

10. The virtual reality-based gait training system of claim 1, wherein, based on a location of a footprint of one foot detected at the gait detection unit, the control unit projects a footprint pattern of another foot for a next gait guide onto a predetermined location according to a level of training difficulty of the trainee.

11. The virtual reality-based gait training system of claim 1, wherein, based on a location of a footprint of one foot detected at the gait detection unit, the control unit projects a footprint pattern of another foot for a next gait guide onto a predetermined location between the trainee and a moving object according to a level of training difficulty of the trainee.

12. The virtual reality-based gait training system of claim 1, wherein, when an illuminance of a projection surface on which the virtual walking environment information is projected is equal to or greater than a first illumination threshold, and when a complexity of a floor pattern of the projection surface is greater than a first complexity threshold, the control unit processes a background color of the virtual walking environment information with a solid color relatively darker than the floor pattern of the projection surface, and processes a gait training object with a complementary color contrasting with the background color.

13. The virtual reality-based gait training system of claim 12, wherein, when the illuminance of the projection surface on which the virtual walking environment information is projected is equal to or greater than the first illumination threshold and when the complexity of the floor pattern of the projection surface is equal to or less than the first complexity threshold the control unit processes the background color of the virtual walking environment information with a solid color relatively brighter than the floor pattern of the projection surface, and processes the gait training object with a complementary color contrasting with the background color.

14. The virtual reality-based gait training system of claim 1, wherein the control unit converts the virtual walking environment information by applying a higher compression rate and projects the converted virtual walking environment information, as a distance from the projector unit to the ground increases.

15. The virtual reality-based gait training system of claim 1, wherein the control unit causes a predetermined portion of the gait inducing object to be displayed darker than other portions.

* * * * *